Patented Dec. 16, 1952

2,622,012

UNITED STATES PATENT OFFICE 2,622,012

PROCESS OF TREATING METATITANIC ACID

Max J. Mayer, Scarsdale, N. Y.

No Drawing. Application October 24, 1946,
Serial No. 705,494

6 Claims. (Cl. 23—202)

This invention relates to the production of metatitanic acid and has particular reference to improvements in processes whereby objectionable conditions and practices incident to prior processes are eliminated.

The raw materials for industrial production of titanium dioxide are ilmenite and sulfuric acid. Ilmenite is attacked by sulfuric acid at elevated temperatures and, after dissolution, the resulting solutions vary in concentration of $TiO_2$, $H_2SO_4$, ferrous sulfate and other minor metallic impurities that are in the form of sulfates, such as magnesium sulfate, aluminum sulfate, etc.

A typical solution, is of the following composition:

| | Grams per liter |
|---|---|
| Total $TiO_2$ | 200 |
| Reduced $TiO_2$ | 2 |
| Fe | 60 |
| Total $H_2SO_4$ | 550 |
| Active $H_2SO_4$ | 445 |

In order to have all of the iron sulfate in divalent form, the solutions are reduced with iron, zinc, or other suitable material, until a small amount of trivalent titanium is formed. A seeding agent in the form of metatitanic acid or dispersed metatitanic acid sol is then added, after which the solution is heated to the boiling point to effect hydrolysis. The resulting precipitate consists of metatitanic acid which contains varying amounts of sulfuric acid, i. e. between 8% and 12% calculated on the basis of $TiO_2$. The sulfuric acid is not absorbed by the $TiO_2$ but forms part of the crystal lattice. Recoveries of metatitanic acid hydrolysate amount to 90–98% of the $TiO_2$ in the solution. After filtration, the hydrolysate is washed with dilute sulfuric acid until the iron content of the metatitanic acid is less than 0.01%. The filtered metatitanic acid pulp then consists of about

| | Per cent |
|---|---|
| $TiO_2$ | 35 |
| $H_2SO_4$ | 3.5 |
| Water | 61.5 |

The sulfuric acid content of the precipitate can be removed by calcination at high temperature. For nearly complete removal of the $SO_3$, a temperature above 800° C. is required. The following Table (I) shows the effect of heat treatment upon the removal of sulfuric acid from the $TiO_2$. $TiO_2$ so treated had originally 9.37% $H_2SO_4$ on the basis of $TiO_2$ content. The material was heated to 350° C. which was maintained for one hour. A test sample was taken and tested for $H_2SO_4$ content. The calcination temperature was then raised to 450° C. and maintained for one hour, after which another sample was taken for analysis of the $H_2SO_4$ content. The heating was continued in like manner at the stages of 550° C., 600° C., and 750° C., the temperature maintained for one hour at each of these stages, with a sample being taken at the end of each stage for determination of the $H_2SO_4$ content.

Table I

| Temperature | $H_2SO_4$ Content |
|---|---|
| | Percent |
| Unheated | 9.37 |
| 350° C | 8.67 |
| 450° C | 6.18 |
| 550° C | 3.25 |
| 600° C | 2.06 |
| 750° C | 0.92 |

During calcination, the metatitanic acid undergoes considerable shrinkage and is converted to calcined $TiO_2$ of anatase structure. The chemical reactivity of such $TiO_2$ is very slight. Sulfuric acid and alkaline solutions show very little or no reaction thereto.

A better procedure than calcination for removal of the $H_2SO_4$ in the precipitated metatitanic acid—purified by washing as heretofore described—consists in further treatment with alkali. After complete neutralization, the resulting sulfate solution is removed by washing, preferably with condensed or deionized water. The washing at the outset causes no difficulty but, after most of the sulfate solution is removed, the precipitate begins to peptize, i. e., becomes colloidal. The filtration is then very difficult, and handling of large quantities becomes well-nigh impossible. The change of particle size incident to colloidization of the precipitate is highly undesirable for many purposes.

Among the objects of this invention is to provide a process whereby the foregoing peptization or colloidization is avoided, so that the washing and filtration may be carried out efficiently and rapidly.

A still further object of this invention is to avoid the foregoing peptization by inexpensive means and without impairing the value of the purified metatitanic acid for use in production of high quality titanium dioxide pigment.

Other further, and more specific objects of this invention will become readily apparent to persons skilled in the art from a consideration of the following description.

According to the present invention, the metatitanic acid is slurried with water and to the slurry is added a solution of salts of elements which form with the hydroxides and carbonates of ammonium and of the alkali metals water-insoluble, white hydroxides, carbonates, or basic carbonates, that calcine to white oxides. In lieu of the water-soluble salts, the corresponding oxides, hydroxides, carbonates or basic carbonates of these elements may be employed. These will react with some of the $SO_4$ content of the metatitanic acid to form soluble sulfates of these elements.

Compounds of the elements of groups 2 to 5 of the periodic table, viz., those forming the aforementioned white, insoluble oxides, hydroxides, carbonates or basic carbonates, can be used according to this invention. The preferred compounds are those of Be, Cd, Al, La, Zr, Ce, Th, Cb, Sb and Ta, either alone or in combination. Compounds of elements which form insoluble sulfates, such as the Ca, Ba, Sr and Pb compounds, are not suitable. Compounds of Mg and Zn are operative when alkali metal compounds are used for neutralization, but are not operative when ammonium compounds are used for neutralization, because, surprisingly, I have found that any small amount of ammonium sulfate thus formed promotes solubility of the hydroxides of Mg and Zn.

Neutralization of the $H_2SO_4$ in the metatitanic acid, and precipitation of the white, insoluble hydroxides, carbonates, or basic carbonates, are then effected with aqueous solutions of the above-mentioned alkaline materials. Since a surplus of the alkaline reagents is not objectionable, pH values greater than 7 may be employed. I prefer to use pH values of 7 to 12.

Instead of first adding the salts to the metatitanic acid, the reverse procedure of first adding the alkaline reagent may be used. In this case, a surplus of alkali above the amount necessary for the neutralization of the $H_2SO_4$ content must be employed. To the resulting slurry are added the water-soluble salts of the elements that form with the alkaline reagents, water-insoluble, white hydroxides, carbonates, or basic carbonates that remain white even after heating. Owing to the surplus of alkaline reagent, the hydroxides, carbonates, or basic carbonates are precipitated.

Another procedure consists in adding the insoluble oxides, hydroxides, carbonates, or basic carbonates to the neutralized metatitanic acid, with thorough stirring.

In all of the above cases, owing to the presence of the insoluble oxides, hydroxides, carbonates, or basic carbonates in the metatitanic acid, substantially all of the sulfates can be washed out without any peptization or colloidization of the precipitate.

The minimum amount of insoluble oxides, hydroxides, carbonates, or basic carbonates, calculated as metal oxides and based on the $TiO_2$ content of the metatitanic acid, is 0.1%. The preferred amounts are between 0.1-2.0% although larger amounts may be used, even up to 6%, calculated as metal oxides, as disclosed in my co-pending application Serial No. 705,493, filed October 24, 1946.

Instead of using the above-mentioned insoluble compounds of elements of groups 2 to 5 of the periodic table, other sufficiently water-insoluble organic acid salts forming white oxides on calcination can likewise be employed. For instance, insoluble salts of magnesium, zinc, aluminum, beryllium, etc., and myristic, palmitic, stearic, oleic, linoleic, linolenic and ricinoleic acids and their homologues can be used. Also, the insoluble salts of polybasic acids, such as sebacates, adipates, etc., can be employed.

The amount of compounds of the di-, tri-, tetra- or penta-valent elements added to the metatitanic acid is from 0.1% to 6%, calculated as metallic oxides based on the $TiO_2$ content of the metatitanic acid, as in my co-pending application Serial No. 705,493.

The following examples will serve to illustrate the practice of this invention.

Example I

To a thick aqueous slurry of metatitanic acid precipitate containing 350 grams $TiO_2$ is added 3 grams of $Al(OH)_3$ which reacts with the $H_2SO_4$ contained in the metatitanic acid, forming water-soluble sulfates of aluminum. The mixture is agitated until the aluminum hydrate has reacted with the sulfuric acid of the metatitanic acid. A 15% solution of ammonia is then added until a pH of 10 is reached which results in precipitation of aluminum hydroxide. The slurry is filtered and washed until substantially free of ammonium sulfate. No peptization occurs.

Example II

To an aqueous slurry of metatitanic acid precipitate containing 350 grams $TiO_2$ is added 184 grams of a 5% zirconium oxychloride solution. Enough 25% basic ammonium carbonate solution is added, under thorough agitation, to bring the pH to 10 which results in precipitation of zirconium hydroxide. After filtration, the precipitate is washed substantially free of ammonium salts. Further washing does not change the character of the precipitate, no peptization occurring.

Example III

To an aqueous slurry of metatitanic acid precipitate containing 350 grams $TiO_2$ is added 100 grams of a 4% potassium antimony tartrate solution. Enough of a 20% ammonia solution is then added, under thorough agitation, to bring the pH to 10 which results in precipitation of antimony hydroxide. The slurry is then filtered, and the precipitate is washed free of soluble salts. No peptization occurs.

Example IV

An aqueous slurry of metatitanic acid precipitate containing 350 grams $TiO_2$ is neutralized with a 10% ammonia solution to 7–12 pH. 8.2 grams of basic zirconium carbonate $$3ZrO_2 \cdot CO_2 \cdot H_2O$$

is added as a water slurry and the whole mixture thoroughly agitated. The mixture is filtered and washed until free of salts, without encountering peptization.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims. The use of corresponding alkali metal compounds for neutralization after introduction of the compound of the specified class of metals is embodied in the claims of my co-pending application Ser. No. 705,495, filed October 24, 1946; the use of corresponding alkali metal compounds for neutralization before introduction of the compound of the specified class of metals is embodied in the claims of my co-pending application Ser. No. 190,890, filed October 18, 1950; and the use of the ammonium compounds for neutralization before introduction of the compound of the specified class of metals is embodied in the claims of my co-pending application Ser. No. 190,889, filed October 18, 1950.

I claim as my invention:

1. In a process of removing the $SO_4$ impurity from metatitanic acid produced by hydrolysis of an aqueous sulfuric acid solution of titanium sulfate, introducing into a slurry of said metatitanic acid a member of the group consisting of the water-soluble salts, the oxides, hydroxides, carbonates and basic carbonates of the class of metals consisting of Be, Cd, Al, La, Zr, Ce, Th, Cb, Sb and Ta in amount equal to 0.1 to 6 per cent calculated as metal oxide based on the $TiO_2$ content of the metatitanic acid, then introducing into the slurry a member of the alkaline group consisting of ammonium hydroxide, ammonium carbonate and ammonium basic carbonate to a 7-12 pH, filtering and then washing the residue until practically free of soluble salts.

2. The process claimed in claim 1, wherein the metal of the class is aluminum.

3. The process claimed in claim 1, wherein the metal of the class is zirconium.

4. The process claimed in claim 1, wherein the metal of the class is antimony.

5. In a process of removing the $SO_4$ impurity from said metatitanic acid produced by hydrolysis of an aqueous sulfuric acid solution of titanium sulfate, introducing into a slurry of metatitanic acid a member of the group consisting of the water soluble salts of the class of metals consisting of Be, Cd, Al, La, Zr, Ce, Th, Cb, Sb and Ta in amount equal to 0.1 to 6 per cent calculated as metal oxide based on the $TiO_2$ content of the metatitanic acid, then introducing into the slurry a member of the alkaline group consisting of ammonium hydroxide, ammonium carbonate and ammonium basic carbonate to a 7-12 pH, filtering and then washing the residue until practically free of soluble salts.

6. In a process of removing the $SO_4$ impurity from said metatitanic acid produced by hydrolysis of an aqueous sulfuric acid solution of titanium sulfate, introducing into a slurry of metatitanic acid a member of the group consisting of the oxides, hydroxides, carbonates and basic carbonates of the class of metals consisting of Be, Cd, Al, La, Zr, Ce, Th, Cb, Sb and Ta in amount equal to 0.1 to 6 per cent calculated as metal oxide based on the $TiO_2$ content of the metatitanic acid, then introducing into the slurry a member of the alkaline group consisting of ammonium hydroxide, ammonium carbonate and ammonium basic carbonate to a 7-12 pH, filtering and then washing the residue until practically free of soluble salts.

MAX J. MAYER.

REFERENCES CITED

The following references are of record in the file of this patent:

UNITED STATES PATENTS

| Number | Name | Date |
|---|---|---|
| 1,361,866 | Jebsen | Dec. 14, 1920 |
| 1,750,287 | Specht | Mar. 11, 1930 |
| 2,062,133 | Kubelka et al. | Nov. 29, 1936 |
| 2,062,134 | Kubelka et al. | Nov. 29, 1936 |
| 2,069,554 | Monk et al. | Feb. 2, 1937 |
| 2,078,278 | Rhodes | Apr. 27, 1937 |
| 2,342,483 | Olson | Feb. 22, 1944 |
| 2,369,246 | Peterson | Feb. 13, 1945 |

FOREIGN PATENTS

| Number | Country | Date |
|---|---|---|
| 309,051 | Great Britain | Apr. 2, 1929 |
| 360,436 | Great Britain | Nov. 2, 1931 |
| 528,955 | Great Britain | Nov. 11, 1941 |
| 553,136 | Great Britain | May 10, 1943 |
| 27,506 | Norway | Jan. 2, 1917 |

OTHER REFERENCES

"Modern Inorganic Chemistry," by J. W. Mellor, Single Vol. Ed., Jan. 1935, page 657. Longmans, Green & Co., N. Y., Publishers.